Figure 4:
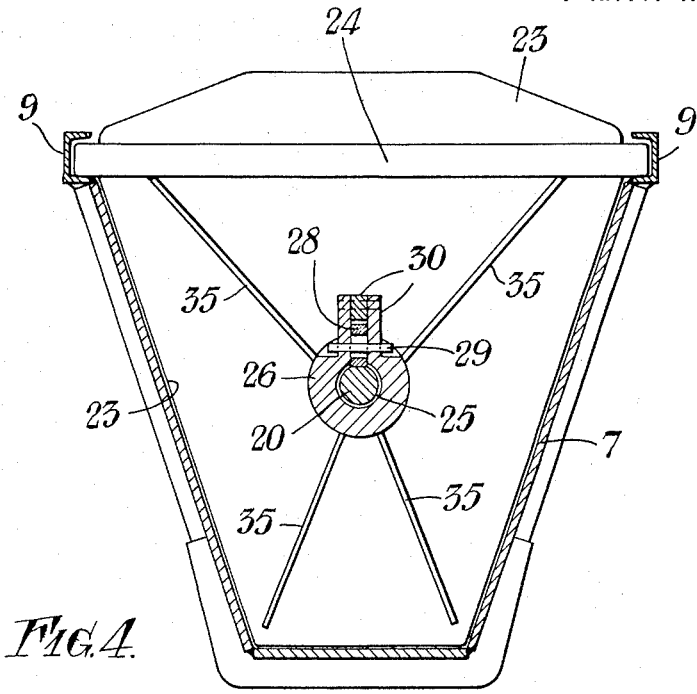

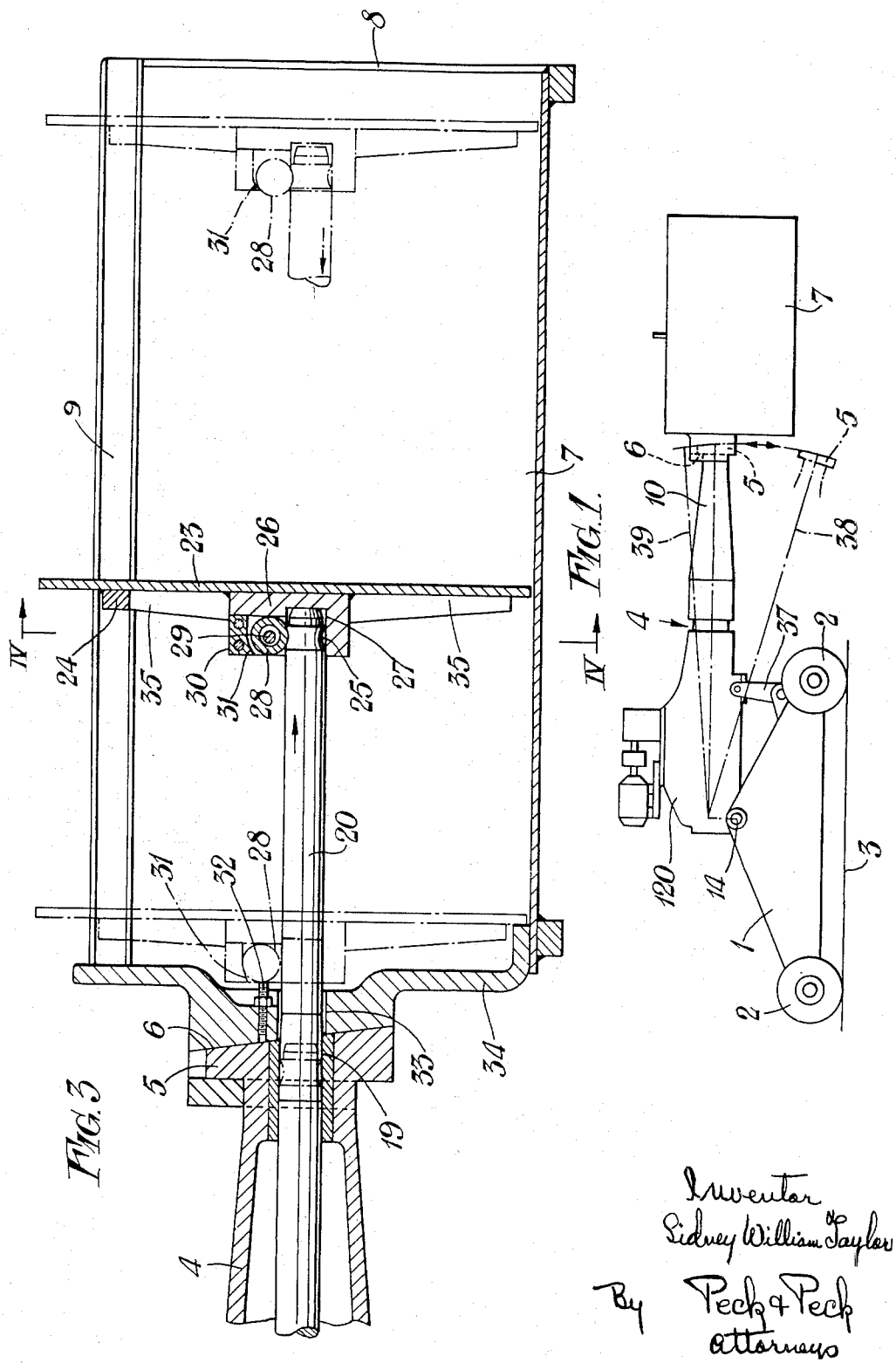

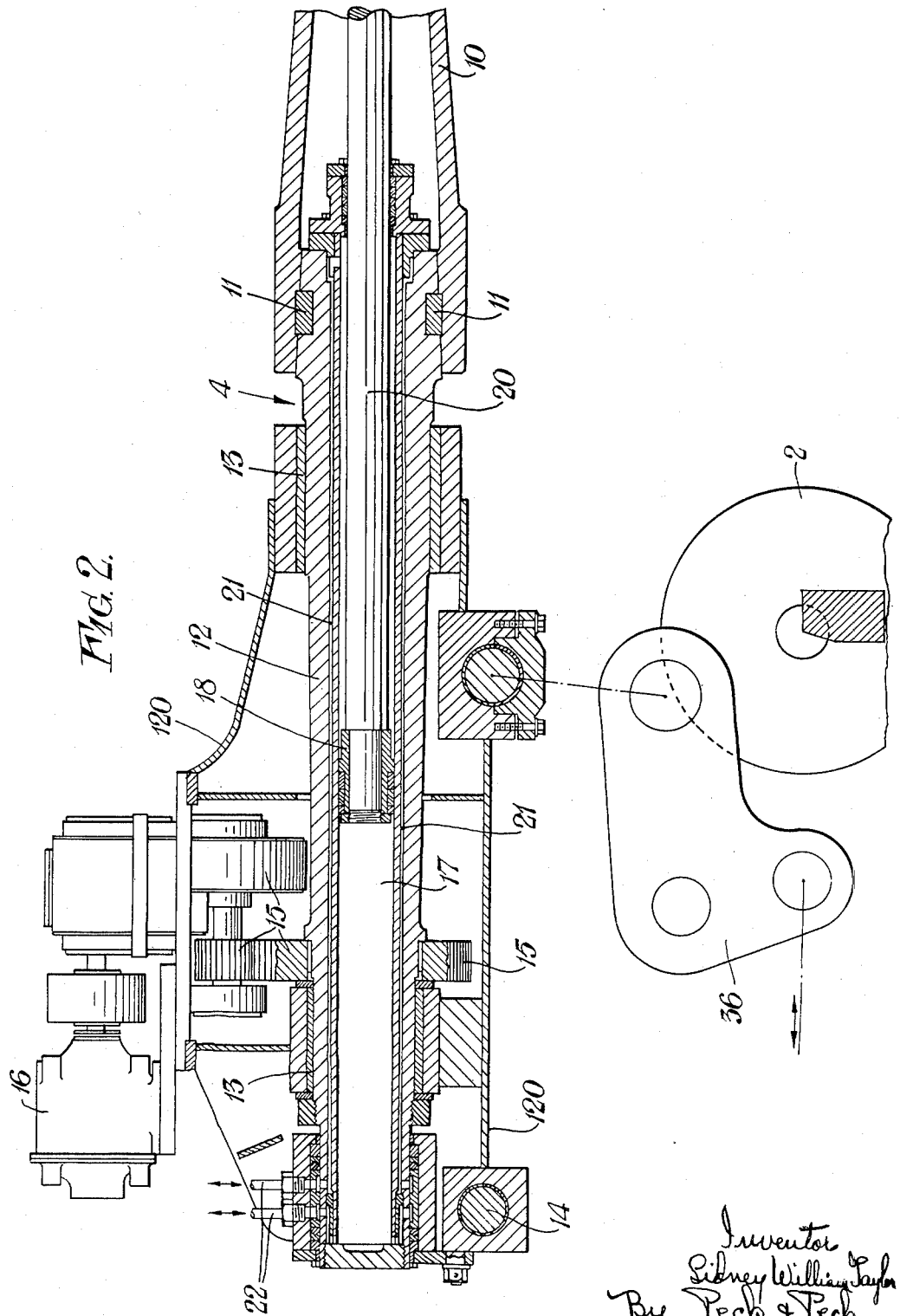

Aug. 9, 1955 S. W. TAYLOR 2,714,966
FURNACE CHARGING MACHINES
Filed June 19, 1951 3 Sheets-Sheet 3

Inventor
Sidney William Taylor
By Peck & Peck
Attorneys

United States Patent Office 2,714,966
Patented Aug. 9, 1955

2,714,966

FURNACE CHARGING MACHINES

Sidney William Taylor, London, England, assignor to The Wellman Smith Owen Engineering Corporation Limited, London, England, a company of Great Britain Application June 19, 1951, Serial No. 232,312

Claims priority, application Great Britain June 21, 1950

5 Claims. (Cl. 214—29)

This invention relates to furnace charging machine of the kind comprising a charging bar having means at its outer end to permit its connection with a charging box and having means to rotate the charging bar and the charging box to deposit the contents of the box into a furnace.

The machine may be suspended from overhead, it may run on rails on the floor or it may be of the run-about type when it is mounted on wheels so that it can be moved to any desired position over a floor.

A furnace charging machine is known having a charging bar with means to connect it to a charging box having its forward end open and a push rod adapted to be connected to a plate movable longitudinally within the box to discharge the contents thereof. Such machine however, has not been capable of also rotating the box to discharge the contents.

Objects of the present invention are to provide an improved charging machine of the kind referred to, and one which enables the contents of the charging box to be discharged by rotating the box or by moving a plate longitudinally within the box to push the contents from the open end thereof.

According to the present invention, a furnace charging machine comprises a charging bar, means at the outer end of the charging bar to connect it disengageably to a charging box, a rod mounted on the charging bar, means to move the rod to cause it to move into an opening in the rear end of the charging box and means operative to turn the charging bar about its longitudinal axis.

According to a second feature of the invention, a charging box for the machine has an axially movable plate mounted therein and operative to push contents of the box through the open forward end thereof, means being provided on the plate to connect it disengageably with the charging-bar rod. For such a charging box the means provided on the machine to move the charging-bar rod would be operative to cause the latter to traverse the charging box and operate the plate.

The means provided on the movable plate of the charging box to connect it disengageably with the charging-bar rod suitably comprises a member or members to engage a depression at the outer end of the rod and another member or members mounted at the rear end of the charging box to engage the first-mentioned member or members and remove the same from engagement with the rod as the plate completes its movement to the rear end of the charging box. Preferably, the first-mentioned member or members comprises or comprise one or more rollers adapted to engage a groove at the outer end, and transverse, of the charging-bar rod, and mounted in a housing member disposed on the plate and extending over the roller or rollers. Suitably, a stop or stops is or are mounted at the rear end of the charging box to engage the roller or rollers to move it or them from the groove when the plate is moved up to said stop or stops.

Figure 5:
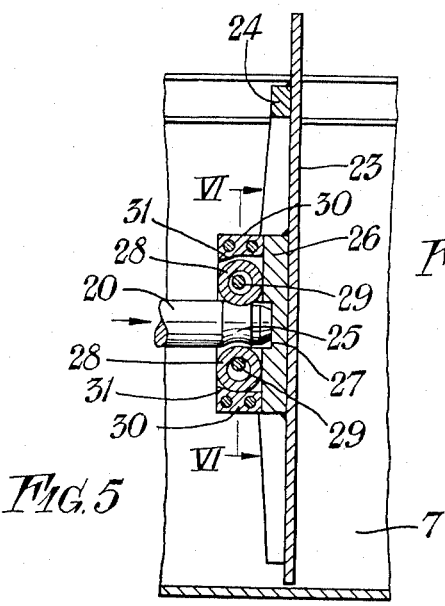
Figure 6:
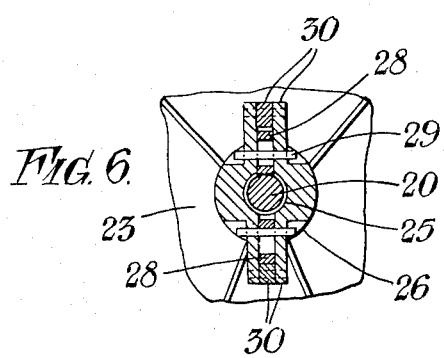

Other features of the present improvements will become apparent from the following description of one form of furnace charging machine and appropriate charging boxes constructed according to the present invention and described by way of example with reference to the accompanying drawings, in which:

Fig. 1 is a more or less diagrammatic side elevation of the one form of the furnace charging machine and includes showing of a charging box, Figs. 2 and 3 together placed end to end, depict the major part of the machine and the charging box in central longitudinal section on a larger scale than Figure 1, the charging box being shown of one appropriate form according to the invention, Fig. 4 is a sectional elevation on the line IV—IV of Fig. 3, Fig. 5 is a fragmentary view illustrating a modified construction of charging box and Fig. 6 is a section on the line VI—VI of Fig. 5.

In the drawings, the furnace charging apparatus comprises a carrier support 1 which is mounted on wheels 2 to enable it to run over the floor 3 or, if desired, to move on rails. Alternatively, the machine could be carried on overhead travelling apparatus as will be well understood. The machine includes a charging bar 4 having at its forward or outer end a wedge-shaped formation 5 to engage a wedge-shaped recess 6 in the rear end of the charging box 7 which has its forward end open at 8. As shown in Fig. 4, the charging box is narrower at the bottom than at the top and the sides at the top are of channel shape at 9. The charging bar is hollow or tubular and in two parts, namely a forward part 10 which is connected by cotters 11 to a rearward part 12. The latter is mounted in bearings 13 carried in a frame 120 which is pivotal about a horizontal axis at 14 on the carrier support 1. The charging bar 4 is connected through a train of gears 15 to a driving motor 16 mounted on the frame 120 and by this means the bar may be rotated about its longitudinal axis. It has mounted centrally within it a cylinder 17 within which is a piston 18 connected to a charging-bar rod 20 (herein termed a push rod), extending forward into a hole 19 in the wedge-shaped front end part 5 of the charging bar. Usual passages for inlet and exhaust of operating fluid are provided at opposite ends of the cylinder 17. The outer diameter of the cylinder is less than the inner diameter of the charging bar, as shown in Fig. 2, and the space 21 between them constitutes a passage for leading the operating fluid from inlets and outlets 22 to either end of the piston 17. In the charging box 7, an axially movable plate 23 (herein termed a pusher plate) is disposed which is of similar shape to the cross-section of the charging box. At the top the pusher plate has a bar-like thickening 24 which is shaped at the ends to engage the channel-shaped side parts 9 of the box.

The push rod 20 has a transverse groove 25 at its forward end as shown in Figs. 3 and 4. A boss 26 on the back of the pusher plate 23 has an opening 27 coaxial with the push rod and a roller 28, mounted loosely on a pin 29 fixed in the boss, engages said groove when the push rod is advanced to abut on the bottom of the recess 27, i. e., in effect, to engage the back of the pusher plate. The boss 26 is formed as a housing 30 extending over the roller 28. This housing has an inwardly projecting rear camming lip 31 and is shaped internally so that the roller may move towards the pusher plate out of the groove 25 or be jammed between the lip 31 and the bottom of the groove, according to the direction of movement of the push rod 20.

When the pusher plate 23 is being moved forwardly by the push rod 20, the roller 28 is free of the lip 31 as shown in full lines in Fig. 3. When the push rod is being withdrawn, as indicated at the dot-and-dash showing to the right of Fig. 3, the roller 28 is jammed between the lip and the bottom of the groove 25, as stated, and the pusher plate is withdrawn with the push rod. The rear end of the charging box 7 has an inwardly projecting stop 32 so positioned that, when the charging plate is fully withdrawn, this stop will engage the roller 28 and move it out of engagement with the lip 31 and out of the groove 25, as indicated by the dot-and-dash lines at the left of Fig. 3, thus freeing the push rod 20 and permitting the latter to be withdrawn from engagment with the pusher plate 23. When connected to the pusher plate, the push rod extends through a hole 33 in the rear end of the charging box and constitutes means to lock the charging bar 4 to the charging box 7 as regards rotatable movement of the box. The pusher plate 23 is reinforced by the bar 24, boss 26 and welded-on ribs 35.

Before use, the charging machine is free of the charging box 7 which usually is rested on an elevated support such as a stand (not shown). In use, the machine is moved over the floor 3 on its wheels 2 to advance it to the rear of the charging box which has already been filled with the materials to be charged into a furnace. At this time, or previously, the charging bar 4 will be lowered about the pivotal axis at 14 by means of the bell-crank lever 36 and connections 37, Figs. 1 and 2. Its position may then be such as is indicated in dot-and-dash lines at 38 in Fig. 1. Having reached the charging box 7 the charging bar is moved upwardly about the pivotal axis 14 to cause its wedge-like front end 5 to engage the recess 6 in the rear end of the charging box 7 for the purpose of lifting the box from its support. The limit of upward movement of the bar may be as indicated by the dot-and-dash line 39 in Fig. 1 for example. The push rod 20 is then moved forward a little by the supply of operating fluid behind the piston 18 of the rod. This moves the forward end of the push rod into the hole 33 in the rear end of the charging box and automatically locks the box to the charging bar. The front end of the push rod also enters the recess 27 in the boss at the back of the pusher plate until the roller 28 falls into the transverse groove 25 in the push rod.

The charging machine is now advanced to a furnace and the box 7 is introduced thereinto, when either the pusher plate 23 is driven forward by causing the piston 18 of the push rod 20 to advance further in its cylinder 17, or the box is turned over by operation of the gearing 15, to discharge the contents of the box. In the latter case, the shaping of the pusher plate at the top and the channel-shaped sides 9 of the box assist in maintaining the plate in position in the box. If the charging box is to be emptied by turning over movement, as stated, the forward end of the box need not be open but may be temporarily closed by means of a cover or slide not shown.

The contents of the charging box 7 having been discharged (and the box turned back by operation of the gearing 15 if it was turned over to discharge it), the machine is moved away from the furnace and the charging box thus withdrawn. At the same time, the pusher plate 23 is withdrawn by the push rod 20 to the rear end of the box being locked to the push rod by the roller 28. At the end of the withdrawal of the plate, the push rod 20 is automatically disconnected from the plate by the action of the stop 32 on the roller 28. The rod then recedes through the end wall 34 of the charging box until it reaches, say the dot-and-dash line position indicated at the left-hand end of Fig. 3. The box is then free so that the charging bar 4 can be moved downwardly about its pivotal axis 14 and disconnected from the charging box after the latter has been rested again on its support.

In the modified construction of charging box shown in Figs. 5 and 6, a pair of rollers 28 is used, one above and one below the push rod 20. The reference numerals used are the same as those used in Figs. 2 to 4 and it is believed that the operation of these rollers will be understood without further description because substantially this modification amounts to a duplication of parts shown in Figs. 2 to 4.

The cross-section of the charging box 7 may be rectangular, circular or other shape as may be desired.

What I claim is:

1. A furnace charging machine comprising a frame, a charging bar mounted to rotate about its longitudinal axis on said frame, a charging box, means at the outer end of said charging bar to connect it non-revolubly with respect to, though disengageably with, said charging box, an axially movable rod mounted in said charging bar, a pusher plate movable through said charging box from end to end thereof, means to connect the outer end of said rod disengageably to said pusher plate, a piston and cylinder combination at the inner end of said rod and bar and coaxial through and operative to impart to said rod a stroke substantially equal to the length of said charging box from end to end, means for operating said combination to enable said rod to move outwardly to lock the charging box to said charging bar and thereafter to engage said pusher plate and means operative to rotate said charging bar about its longitudinal axis without interrupting the fluid pressure connections to said piston and cylinder combination.

2. A furnace charging machine according to claim 1, wherein the charging bar encloses said piston and cylinder combination and the outer diameter of the cylinder of this piston and cylinder combination is less than the inner diameter of the charging bar, the space between them being adapted to constitute annular passages operative to lead operating fluid from fluid pressure inlet and outlet connections to either end of said cylinder.

3. A furnace charging machine according to claim 1, wherein one or more rollers adapted to engage a groove at the outer end, and transverse of the charging bar rod, are mounted in a housing member disposed on the pusher plate and having a cam surface or surfaces to move the roller or rollers into said groove on retractive movement of said rod.

4. A furnace charging machine according to claim 1, wherein one or more rollers adapted to engage a groove at the outer end, and transverse of the charging bar rod, are mounted in a housing member disposed on the pusher plate and having a cam surface or surfaces to move the roller or rollers into said groove on retractive movement of said rod, and wherein a stop or stops is or are mounted at the rear end of the charging box to engage the roller or rollers and move it or them from the groove when the plate is moved up to said stop or stops.

5. A furnace charging machine comprising a charging bar, a charging box, means at the outer end of the charging bar to connect it disengageably to said charging box, an axially movable rod mounted in said charging bar, a pusher plate movable through said charging box from end to end thereof, means to move said rod outwardly into an opening in the rear end of the charger box and means to connect said rod disengageably to said pusher plate, characterised in that said charging box is revoluble about the axis of said charging bar to an inverted position and that a connection between said charging box and said pusher plate is provided which comprises outwardly-directed projections at opposite sides of said pusher plate and inwardly-directed projections on opposite sides of said charging box and extending substantially the length thereof and slidably engaged by the first-mentioned projections during movement of the said plate through said box, the said projections cooperating to retain the pusher plate in the charging box when the latter is revolved to the inverted position.

References Cited in the file of this patent

UNITED STATES PATENTS

| | | |
|---|---|---|
| 1,828,762 | Brosius | Oct. 27, 1931 |
| 2,405,342 | Brosius | Aug. 6, 1946 |